United States Patent [11] 3,624,204

[72] Inventors Mikhail Konstantinovich Stepanov
Kirovsky prospekt, 68, kv. 65;
Vladimir Tevosovich Osipyan, ulitsa
Pesochnaya, 24, kv. 2; Viktor Borisovich
Kazhdan, ulitsa Matrosa Zheleznyaka, 13,
kv. 45; Leonid Kuymich Masly, prospekt
Kosmonavtov, 13, kv. 98; Boris Stefanovich
Grabovsky, Lesnoi prospekt, 4, kv. 7; Irina
Dmitrievna Dunaeva, ulitsa Mokhovaya,
47, kv. 20, all of Leningrad, U.S.S.R.
[21] Appl. No. 819,094
[22] Filed Apr. 24, 1969
[45] Patented Nov. 30, 1971
Continuation-in-part of application Ser. No.
625,632, Mar. 27, 1967, now abandoned.
This application Apr. 24, 1969, Ser. No.
819,094

[54] PROTECTIVE AGENT AGAINST MOSQUITOES,
SAND FLIES, BLACK-FLIES, GNATS, HORSE-
FLIES, FLEAS AND TICKS
5 Claims, No Drawings

[52] U.S. Cl. .................................................. 424/244
[51] Int. Cl. .................................................. A01n 9/00
[50] Field of Search ...................................... 424/244,
308, DIG. 10

[56] References Cited
UNITED STATES PATENTS
2,435,005  1/1948  Huppke et al. ............... 424/308

Primary Examiner—Jerome D. Goldberg
Assistant Examiner—Frederick E. Waddell
Attorney—Waters, Roditi, Schwartz and Nissen ABSTRACT: A repellent agent for protecting people and animals from mosquitoes, sand-flies, black-flies, gnats, horse-flies, fleas and ticks, characterized by the inclusion of hexamethylenecarbamide in an amount between 20 and 90 percent.

PROTECTIVE AGENT AGAINST MOSQUITOES, SAND-FLIES, BLACK-FLIES, GNATS, HORSE-FLIES, FLEAS AND TICKS

OTHER APPLICATIONS

C-I-P of Appln. Ser. No. 625.632. filed March 24, 1967, now abandoned.

DETAILED DESCRIPTION

This invention relates to a method of protecting and protective agents against mosquitoes, sand-flies, black-flies, horse-flies, fleas and ticks. A method is known of protecting a subject against arthropoda, bloodsucking insects by applying to said subject a protective agent containing m-diethyltoluamide as a repellent.

A disadvantage of the known protection method is the high cost of the repellent used due to the complicated process for its production.

Another disadvantage of the known method is that the protection agent based on m-diethyltoluamide, which is used in this method, provides only a short protective effect when applied to fabric.

It is an object of the present invention to provide a method of protecting against mosquitoes, sand-flies black-flies, horse-flies, fleas and ticks wherein use is made of a protective agent based on a cheaper repellent.

It is another object of the present invention to provide a protection method wherein use is made of a protective agent based on a more effective repellent.

In accordance with the foregoing and additional objects in the method of protecting against the above-mentioned arthropoda bloodsucking insects use is made of a protective agent which contains hexamethylenecarbamide as a repellent.

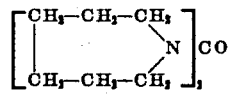

It is expedient to protect human skin by a method wherein use is made of a protective agent in the form of an ointment consisting essentially of 30–60 percent by weight of dimethyl phthalate, 20–40 percent by weight of hexamethylenecarbamide, 5–15 percent by weight of ethyl cellulose and 5–15 percent by weight of talc.

Impregnating clothing, spraying premises and spraying farm animals is preferably effected by a method wherein use is made of a protective agent in the form of an emulsion consisting essentially of 60–90 percent by weight of hexamethylenecarbamide 9–35 percent by weight of partially saponified polyvinyl acetate, containing 10–20 percent of acetyl groups, prepared from polyvinyl acetate having a viscosity of 25–35 centipoises, a 4 percent aqueous solution of said partially saponified polyvinyl acetate having a viscosity of 15–24 centipoises.

The subject matter of the present invention is also a protective agent based on the repellent hexamethylenecarbamide, whose application in such forms as an ointment and emulsion is described hereinbefore.

The protective agent can likewise be employed in the form of creams, solutions or solid bars.

Hexamethylenecarbamide which is the active principle of said protective composition is produced by passing phosgene (to give an acidic reaction) at a temperature of from 0° to 5° C. through an aqueous solution containing 72 parts by weight of sodium hydroxide (whose concentration in the solution shall not extend 15 percent and 150 parts by weight of hexamethyleneimine which is a waste product in the production of hexamethylenediamine.

Hexamethylenecarbamide is an oily colorless liquid with a very faint odor and is insoluble in water. The cost is approximately one-eighth that of m-diethyltoluamide.

In table 1 laboratory-experimental data are presented characterizing the activity of hexamethylenecarbamide as compared to such widely known repellents as dimethyl phtalate and m-diethyltoluamid.

The fleas Ceratophyllus tesquorum and the ticks Hyalomma asiaticum asiaticum were used in biological tests.

The activity of the composition was expressed by repellent coefficient.

The test technique has been described by the present inventors, V. G. Osipiyan and al. in the journal "Meditsinskaya Parazitologiya i Parazitarnye bolezni," No. 6, 1961, Moscow.

TABLE 1.—COMPARATIVE ACTIVITY OF REPELLENTS WITH RESPECT TO FLEAS AND TICKS

| Repellent | Repellent coefficient with respect to fleas, percent | Repellent coefficient with respect to ticks percent |
|---|---|---|
| m-Diethyltoluamide | 99 | 96 |
| Dimethyl phthalate | 99 | 86 |
| Hexamethylenecarbamide | 95 | 98 |

In table 2 data are presented on comparative duration of the composition activity with respect to fleas.

The tests were carried out by the above-mentioned technique on samples of cotton fabric impregnated with the aforementioned preparations (40 g./m.²).

TABLE 2.—DURATION OF REPELLENT ACTIVITY

| Repellent | Initial | Repellent coefficient, percent after— | | | | | |
|---|---|---|---|---|---|---|---|
| | | 1-month storage | 2-month storage | 3-month storage | 4-month storage | 5-month storage | 6-month storage |
| m-Diethyltoluamide | 99 | 100 | 39 | 0 | 0 | 0 | 0 |
| Dimethylphthalate | 99 | 14 | 0 | 0 | 0 | 0 | 0 |
| Hexamethylenecarbamide | 95 | 100 | 100 | 100 | 96 | 81 | 59 |

The samples were kept at a temperature of 20±5 percent.

For a better understanding of the present invention by those skilled in the art, the following examples of applying the protective agent based on hexamethylenecarbamide are given by way of illustration.

EXAMPLE 1

An ointment comprising 52 percent by weight dimethyl phthalate, 30 percent by weight hexamethylenecarbamide, 10 percent by weight ethyl cellulose and 8 percent by weight talc is applied in a thin layer to uncovered areas of the human skin. At a temperature of 20° C. this provides protection against mosquitoes, sand-flies and black-flies for 24–36 hours. A similar ointment containing m-diethyltoluamide in place of hexamethylenecarbamide provides protection for 18–24 hours.

EXAMPLE 2

An emulsion (can be kept for over a year) comprising 75 percent by weight hexamethylenecarbamide, 23 percent by weight water and 2 percent by weight of a partially saponified polyvinyl acetate, containing 13 percent of acetyl groups and obtained from polyvinyl acetate having a viscosity of 31 centipoises, a 4 percent aqueous solution of said partially saponified polyvinyl acetate having a viscosity of 17 centipoises, is diluted with water to a concentration of 10 percent.

The emulsion obtained is used for impregnating clothing (protective nets, cloaks, outer garments, etc.) to a gain in weight of 10 percent. At an average temperature of 20° C. clothing thus impregnated provides protection against mosquitoes, sand-flies, black-flies, horse-flies, fleas and ticks for 5 months and more.

Similar clothing impregnated with an emulsion based on m- diethyltoluamide to the same gain in weight loses its protective properties under the same conditions in 1–2 months.

EXAMPLE 3

Clothing (protective nets, cloaks, etc.) or human skin is rubbed with a solid bar comprising 40 percent by weight hexamethylenecarbamide, 50 percent by weight stearic acid, 7 percent by weight ethyl cellulose and 3 percent by weight beeswax.

At an average temperature of 20° C. clothing thus impregnated provides protection against mosquitoes, sand-flies, black-flies, horse-flies, fleas and ticks for 2–3 weeks.

When rubbing uncovered areas of skin protection against the aforementioned insects is provided for 20–30 hours.

EXAMPLE 4

An ointment comprising 7 percent by weight silica gel, 30 percent by weight hexamethylenecarbamide, 7 percent by weight ethyl cellulose, 10 percent by weight shellac, 25 percent by weight isopropyl alcohol, 20 percent by weight acetone and 1 percent by weight surfactant of Tween 80-type, is applied in a thin layer on uncovered areas of human skin. At a temperature of 20° C. this provides protection against mosquitoes, sand-flies and black-flies for 10–15 hours.

EXAMPLE 5

A lotion comprising 20 percent by weight hexamethylenecarbamide, 10 percent by weight glycerol and 70 percent by weight isopropyl alcohol is applied on uncovered areas of human skin. At a temperature of 20° C. this provides protection against mosquitoes, sand-flies and black-flies for 7–10 hours.

Though the present invention has been described in accordance with a preferred embodiment, various changes and modifications may be made in carrying out the present invention without departing from the spirit and scope thereof as will be understood by those skilled in the art.

These changes and modifications are to be considered as falling within the spirit and scope of the invention as defined in the appended claims.

What we claim is:

1. A method of protecting humans and animals against mosquitoes, sand-flies, black-flies, horse-flies, fleas and ticks which comprises applying to said humans and animals an effective repelling quantity of hexamethylenecarbamide.

2. The method of claim 1, wherein said carbamide is employed in the form of an ointment consisting essentially of 30–60 percent by weight of dimethyl phthalate, 20–40 percent by weight of hexamethylenecarbamide, 5–15 percent by weight of ethyl cellulose and 5–15 percent by weight of talc.

3. The method of claim 1, wherein said carbamide is employed in the form of an emulsion consisting essentially of 60–90 percent by weight of hexamethylenecarbamide, 9–35 percent by weight of water and 1–5 percent by weight of partially saponified polyvinyl acetate containing 10–20 percent by weight of acetyl groups and prepared from polyvinyl acetate having a viscosity of 28–35 centipoises, a 4 percent aqueous solution of said partially saponified polyvinyl acetate having a viscosity of 15–24 centipoises.

4. A protective agent against mosquitoes, sand-flies, black-flies, horse-flies, fleas and ticks comprising an ointment which protects the human skin and consists essentially of 30–60 percent by weight of dimethyl phthalate, 20–40 percent by weight of hexamethylenecarbamide, 5–15 percent by weight of ethyl cellulose and 5–15 percent by weight of talc.

5. A protective agent against mosquitoes, sand-flies, black-flies, horse-flies, fleas and ticks comprising an emulsion consisting essentially of 60–90 percent by weight of hexamethylenecarbamide, 9–35 percent by weight of water and 1–5 percent of partially saponified polyvinyl acetate containing 10–20 percent of acetyl groups, prepared from polyvinyl acetate having a viscosity of 28–35 centipoises, a 4 percent aqueous solution of said partially saponified polyvinyl acetate having a viscosity 15–24 centipoises.

* * * * *